United States Patent
Kounavis et al.

(10) Patent No.: US 11,580,234 B2
(45) Date of Patent: Feb. 14, 2023

(54) IMPLICIT INTEGRITY FOR CRYPTOGRAPHIC COMPUTING

(71) Applicant: Intel Corporation, Santa Clara, CA (US)

(72) Inventors: Michael E. Kounavis, Portland, OR (US); Santosh Ghosh, Hillsboro, OR (US); Sergej Deutsch, Hillsboro, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 212 days.

(21) Appl. No.: 16/709,612

(22) Filed: Dec. 10, 2019

(65) Prior Publication Data

US 2020/0117810 A1  Apr. 16, 2020

Related U.S. Application Data

(60) Provisional application No. 62/868,884, filed on Jun. 29, 2019.

(51) Int. Cl.
  *G06F 21/00* (2013.01)
  *G06F 21/60* (2013.01)
  (Continued)

(52) U.S. Cl.
  CPC ........ *G06F 21/602* (2013.01); *G06F 9/30043* (2013.01); *G06F 9/30101* (2013.01);
  (Continued)

(58) Field of Classification Search
  CPC ............... G06F 21/602; G06F 9/30043; G06F 9/30101; G06F 9/30178; G06F 9/321;
  (Continued)

(56) References Cited

U.S. PATENT DOCUMENTS

| 6,570,989 B1 | 5/2003 | Ohmori et al. |
| 7,043,016 B2 | 5/2006 | Roelse |

(Continued)

FOREIGN PATENT DOCUMENTS

| DE | 102018125786 A1 * | 5/2019 | .............. G06F 11/08 |
| EP | 2073430 A1 | 6/2009 | |

(Continued)

OTHER PUBLICATIONS

Andreatos et al., "A comparison of random number sequences for image encryption", Mathematical Methods in Science and Engineering, 2014, pp. 146-151 (Year: 2014).*

(Continued)

*Primary Examiner* — John B King
(74) *Attorney, Agent, or Firm* — Alliance IP, LLC

(57) ABSTRACT

In one embodiment, a processor includes a memory hierarchy and a core coupled to the memory hierarchy. The memory hierarchy stores encrypted data, and the core includes circuitry to access the encrypted data stored in the memory hierarchy, decrypt the encrypted data to yield decrypted data, perform an entropy test on the decrypted data, and update a processor state based on a result of the entropy test. The entropy test may include determining a number of data entities in the decrypted data whose values are equal to one another, determining a number of adjacent data entities in the decrypted data whose values are equal to one another, determining a number of data entities in the decrypted data whose values are equal to at least one special value from a set of special values, or determining a sum of n highest data entity value frequencies.

20 Claims, 8 Drawing Sheets

(51) Int. Cl.

| | | |
|---|---|---|
| G06F 12/0897 | (2016.01) | |
| G06F 9/30 | (2018.01) | |
| G06F 9/48 | (2006.01) | |
| G06F 21/72 | (2013.01) | |
| H04L 9/06 | (2006.01) | |
| G06F 12/06 | (2006.01) | |
| G06F 12/0875 | (2016.01) | |
| G06F 21/79 | (2013.01) | |
| G06F 9/455 | (2018.01) | |
| G06F 12/0811 | (2016.01) | |
| G06F 21/12 | (2013.01) | |
| H04L 9/08 | (2006.01) | |
| G06F 12/14 | (2006.01) | |
| G06F 9/32 | (2018.01) | |
| G06F 9/50 | (2006.01) | |
| G06F 12/02 | (2006.01) | |
| H04L 9/14 | (2006.01) | |
| G06F 21/62 | (2013.01) | |

(52) U.S. Cl.
CPC .......... *G06F 9/30178* (2013.01); *G06F 9/321* (2013.01); *G06F 9/45558* (2013.01); *G06F 9/48* (2013.01); *G06F 9/5016* (2013.01); *G06F 12/0207* (2013.01); *G06F 12/0646* (2013.01); *G06F 12/0811* (2013.01); *G06F 12/0875* (2013.01); *G06F 12/0897* (2013.01); *G06F 12/1408* (2013.01); *G06F 12/1458* (2013.01); *G06F 12/1466* (2013.01); *G06F 21/12* (2013.01); *G06F 21/6227* (2013.01); *G06F 21/72* (2013.01); *G06F 21/79* (2013.01); *H04L 9/0637* (2013.01); *H04L 9/0822* (2013.01); *H04L 9/0861* (2013.01); *H04L 9/0869* (2013.01); *H04L 9/0894* (2013.01); *H04L 9/14* (2013.01); *G06F 2009/45587* (2013.01); *G06F 2212/1052* (2013.01); *H04L 2209/125* (2013.01)

(58) Field of Classification Search
CPC ...... G06F 9/45558; G06F 9/48; G06F 9/5016; G06F 12/0207; G06F 12/0646; G06F 12/0811; G06F 12/0875; G06F 12/0897; G06F 12/1408; G06F 12/1458; G06F 12/1466; G06F 21/12; G06F 21/6227; G06F 21/72; G06F 21/79; G06F 2009/45587; G06F 2212/1052; G06F 21/54; G06F 21/78; G06F 21/556; G06F 2212/1032; G06F 2212/1041; G06F 2212/402; G06F 2221/2107; G06F 21/64; H04L 9/0637; H04L 9/0822; H04L 9/0861; H04L 9/0869; H04L 9/0894; H04L 9/14; H04L 2209/125; H04L 9/0836; H04L 9/3242; H04L 9/0631; H04L 9/32

See application file for complete search history.

(56) References Cited

U.S. PATENT DOCUMENTS

| | | | |
|---|---|---|---|
| 7,254,718 B2 | 8/2007 | Kaminaga et al. | |
| 7,907,723 B2 | 3/2011 | Rubin | |
| 8,085,934 B1 | 12/2011 | Bhooma | |
| 8,675,868 B1 | 3/2014 | Yearsley et al. | |
| 8,798,263 B2 | 8/2014 | Pasini et al. | |
| 9,213,653 B2 | 12/2015 | Durham et al. | |
| 9,350,534 B1 | 5/2016 | Poo et al. | |
| 9,436,847 B2 | 9/2016 | Durham et al. | |
| 9,514,285 B2 | 12/2016 | Durham et al. | |
| 9,811,661 B1 | 11/2017 | Golovkin et al. | |
| 9,830,162 B2 | 11/2017 | LeMay | |
| 9,990,249 B2 | 6/2018 | Durham et al. | |
| 10,216,522 B2 | 2/2019 | LeMay | |
| 10,387,305 B2 | 8/2019 | Durham et al. | |
| 10,536,266 B2 * | 1/2020 | Courtney | G06F 7/58 |
| 10,585,809 B2 | 3/2020 | Durham et al. | |
| 10,706,164 B2 | 7/2020 | LeMay et al. | |
| 10,769,272 B2 | 9/2020 | Durham et al. | |
| 10,860,709 B2 | 12/2020 | LeMay et al. | |
| 2002/0094081 A1 | 7/2002 | Medvinsky | |
| 2003/0091185 A1 | 5/2003 | Swindlehurst et al. | |
| 2003/0101362 A1 * | 5/2003 | Dia | G06F 1/3203 713/300 |
| 2003/0126349 A1 * | 7/2003 | Nalawadi | G06F 9/4812 711/2 |
| 2003/0149869 A1 | 8/2003 | Gleichauf | |
| 2004/0123288 A1 * | 6/2004 | Bennett | G06F 9/45558 718/1 |
| 2004/0215895 A1 | 10/2004 | Cypher | |
| 2004/0268057 A1 | 12/2004 | Landin et al. | |
| 2007/0152854 A1 * | 7/2007 | Copley | G06F 21/554 341/51 |
| 2007/0201691 A1 | 8/2007 | Kumagaya | |
| 2008/0080708 A1 | 4/2008 | McAlister et al. | |
| 2008/0130895 A1 | 6/2008 | Jueneman et al. | |
| 2008/0140968 A1 | 6/2008 | Doshi et al. | |
| 2008/0263117 A1 * | 10/2008 | Rose | H04L 9/0869 713/1 |
| 2009/0172393 A1 | 7/2009 | Tanik et al. | |
| 2009/0220071 A1 | 9/2009 | Gueron et al. | |
| 2009/0254774 A1 | 10/2009 | Chamdani et al. | |
| 2010/0023707 A1 * | 1/2010 | Hohmuth | G06F 9/30087 711/152 |
| 2011/0099429 A1 | 4/2011 | Varma et al. | |
| 2011/0161680 A1 | 6/2011 | Grube et al. | |
| 2011/0296202 A1 | 12/2011 | Henry et al. | |
| 2012/0163453 A1 * | 6/2012 | Horowitz | H04N 19/172 375/E7.243 |
| 2012/0284461 A1 | 11/2012 | Larin et al. | |
| 2013/0275766 A1 | 10/2013 | Plainecassagne et al. | |
| 2014/0173293 A1 | 6/2014 | Kaplan | |
| 2014/0270159 A1 | 9/2014 | Youn et al. | |
| 2015/0234728 A1 * | 8/2015 | Coleman | G06F 11/3024 714/57 |
| 2015/0244518 A1 | 8/2015 | Koo et al. | |
| 2015/0378941 A1 | 12/2015 | Rozas et al. | |
| 2016/0056954 A1 | 2/2016 | Lee et al. | |
| 2016/0092702 A1 | 3/2016 | Durham et al. | |
| 2016/0094552 A1 | 3/2016 | Durham et al. | |
| 2016/0104009 A1 | 4/2016 | Henry et al. | |
| 2016/0154963 A1 | 6/2016 | Kumar et al. | |
| 2016/0188889 A1 | 6/2016 | Trivedi et al. | |
| 2016/0285892 A1 | 9/2016 | Kishinevsky et al. | |
| 2016/0364707 A1 | 12/2016 | Varma | |
| 2017/0063532 A1 | 3/2017 | Bhattacharyya et al. | |
| 2017/0177368 A1 | 6/2017 | DeHon et al. | |
| 2017/0285976 A1 | 10/2017 | Durham et al. | |
| 2018/0095812 A1 | 4/2018 | Deutsch et al. | |
| 2018/0095906 A1 | 4/2018 | Doshi et al. | |
| 2018/0109508 A1 | 4/2018 | Wall et al. | |
| 2018/0287785 A1 | 10/2018 | Pfannenschmidt et al. | |
| 2018/0365069 A1 | 12/2018 | Nemiroff et al. | |
| 2019/0026236 A1 | 1/2019 | Barnes | |
| 2019/0042369 A1 * | 2/2019 | Deutsch | G06F 3/0673 |
| 2019/0042481 A1 | 2/2019 | Feghali et al. | |
| 2019/0042734 A1 | 2/2019 | Kounavis et al. | |
| 2019/0042766 A1 | 2/2019 | Pappachan et al. | |
| 2019/0042796 A1 | 2/2019 | Bokern et al. | |
| 2019/0042799 A1 | 2/2019 | Durham et al. | |
| 2019/0044954 A1 | 2/2019 | Kounavis et al. | |
| 2019/0045016 A1 * | 2/2019 | Dewan | H04L 67/142 |
| 2019/0050558 A1 | 2/2019 | LeMay et al. | |
| 2019/0095350 A1 | 3/2019 | Durham et al. | |
| 2019/0097794 A1 | 3/2019 | Nix | |
| 2019/0102567 A1 | 4/2019 | LeMay et al. | |
| 2019/0102577 A1 | 4/2019 | Gueron et al. | |
| 2019/0227951 A1 | 7/2019 | Durham et al. | |

(56) References Cited

U.S. PATENT DOCUMENTS

| | | |
|---|---|---|
| 2019/0319781 A1 | 10/2019 | Chhabra et al. |
| 2019/0347445 A1 | 11/2019 | Chen |
| 2019/0354726 A1 | 11/2019 | Critelli et al. |
| 2020/0004953 A1 | 1/2020 | LeMay et al. |
| 2020/0007332 A1 | 1/2020 | Girkar et al. |
| 2020/0076585 A1 | 3/2020 | Sheppard et al. |
| 2020/0117810 A1 | 4/2020 | Kounavis et al. |
| 2020/0125501 A1 | 4/2020 | Durham et al. |
| 2020/0125502 A1 | 4/2020 | Durham et al. |
| 2020/0125742 A1 | 4/2020 | Kounavis et al. |
| 2020/0125769 A1 | 4/2020 | Kounavis et al. |
| 2020/0125770 A1 | 4/2020 | LeMay et al. |
| 2020/0134234 A1 | 4/2020 | LeMay et al. |
| 2020/0145187 A1 | 5/2020 | Kounavis et al. |
| 2020/0145199 A1 | 5/2020 | Kounavis et al. |
| 2020/0159676 A1 | 5/2020 | Durham et al. |
| 2020/0169383 A1 | 5/2020 | Durham et al. |
| 2020/0201789 A1 | 6/2020 | Durham et al. |
| 2020/0257827 A1 | 8/2020 | Kounavis et al. |
| 2020/0380140 A1 | 12/2020 | Medwed et al. |
| 2020/0382289 A1 | 12/2020 | Xue et al. |
| 2021/0004470 A1 | 1/2021 | Babic et al. |
| 2021/0058379 A1 | 2/2021 | Bursell et al. |
| 2021/0117340 A1 | 4/2021 | Trikalinou et al. |
| 2021/0117342 A1 | 4/2021 | Durham |
| 2021/0149825 A1 | 5/2021 | Durham et al. |
| 2021/0150040 A1 | 5/2021 | Durham et al. |
| 2021/0218547 A1 | 7/2021 | Weiler et al. |
| 2022/0019698 A1 | 1/2022 | Durham et al. |

FOREIGN PATENT DOCUMENTS

| | | |
|---|---|---|
| EP | 3326102 A1 | 5/2018 |
| JP | 2009139899 A | 6/2009 |
| WO | 2017014885 A1 | 1/2017 |

OTHER PUBLICATIONS

EPO; Extended European Search Report issued in European Patent Application No. EP 20163095.1, dated Aug. 10, 2020; 9 pages.

Neagu, Madalin, et al.; "Increasing Memory Security Through Data Scrambling and Information Entropy Models," 2014 IEEE 15th International Symposium on Computational Intelligence and Informatics; Nov. 2014; 5 pages.

Kwon, Albert et al., "Low-Fat Pointers: Compact Encoding and Efficient Gate-Level Implementation of Fat Pointers for Spatial Safety and Capability-based Security," CCS' 13: Proceedings of the 2013 ACM SIGSAC Conference on Computer & Communications Security, Nov. 4-8, 2013, Berlin Germany (12 pages).

Pyo, Changwoo, "Encoding Function Pointers and Memory Arrangement Checking against Buffer Overflow Attack," In Proceedings of the 4th International Conference on Information and Communications Security (ICICS 2002) (12 pages).

USPTO Non-Final Office Action in U.S. Appl. No. 17/134,406 dated Jan. 21, 2022 (11 pages).

USPTO Notice of Allowance in U.S. Appl. No. 16/723,977 dated Feb. 3, 2022 (13 pages).

Yang, Jun et al., "Improving Memory Encryption Performance in Secure Processors," IEEE Transactions on Computers, vol. 54, No. 5, May 2005 (11 pages).

USPTO Notice of Allowance in U.S. Appl. No. 16/724,105 dated Nov. 16, 2021 (9 pages).

USPTO Non-Final Office Action in U.S. Appl. No. 16/723,977 dated Aug. 3, 2021 (37 pages).

USPTO Notice of Allowance in U.S. Appl. No. 16/723,468 dated Oct. 18, 2021 (11 pages).

USPTO Notice of Allowance in U.S. Appl. No. 16/723,927 dated Dec. 24, 2021 (13 pages).

USPTO Non-Final Office Action in U.S. Appl. No. 16/723,927 dated Jun. 8, 2021 (32 pages).

USPTO Non-Final Office Action in U.S. Appl. No. 16/724,105 dated Jul. 13, 2021 (10 page).

USPTO Final Office Action in U.S. Appl. No. 16/720,059 dated Jan. 21, 2022 (20 pages).

"Armv8.5—A Memory Tagging Extension White Paper", Oct. 9, 2019, accessed at https://developer.arm.com/-/media/Arm%20Developer%20Community/PDF/Arm_Memory_Tagging_Extension_Whitepaper.pdf, 9 pages.

Avanzi, Roberto, "The QARMA Block Ciper Family, Almost MDS Matrices Over Rings With Zero Divisors, Nearly Symmetric Even-Mansour Constructions With Non-Involutory Central Rounds, and Search Heuristics for Low-Latency S-Boxes," Qualcomm Product Security, Munich Germany, IACR Transactions on Symmetric Cryptology, 2017 (1) (40 pages).

Beaulieu, Ray et al., "Simon and Spec: Block Ciphers for the Internet of Things," National Security Agency, Jul. 2015 (15 pages).

Borghoff, Julia et al., "PRINCE—A Low-Latancy Block Ciper for Pervasive Computing Applications," Advances in Cryptology—ASIACRYPT 2012—18th International Conference on the Theory and Application of Cryptology and Information Security, Beijing, China, Dec. 2-6, 2012. Proceedings (pp. 208-225).

Carr, Scott A. et al., "DataShield: Configurable Data Confidentiality and Integrity," ASIA CCS, '17, Apr. 2-6, 2017, Purdue University, Abu Dhabi, United Arab Emirates (12 pages).

Chen, Tony, et al., "Pointer Tagging for Memory Safety", accessed at https://www.microsoft.com/en-us/research/uploads/prod/2019/07/Pointer-Tagging-for-Memory-Safety.pdf, Jul. 2019, 23 pages.

EPO; Extended European Search Report issued in EP Patent Application No. 20163534.9, dated Sep. 24, 2020; 8 pages.

EPO; Extended European Search Report issued in EP Patent Application No. 20163546.3, dated Sep. 28, 2020; 8 pages.

EPO; Extended European Search Report issued in EP Patent Application No. 20163670.1, dated Sep. 29, 2020; 8 pages.

EPO; Extended European Search Report issued in EP Patent Application No. 20163907.7, dated Oct. 6, 2020; 9 pages.

EPO; Extended European Search Report issued in EP Patent Application No. 20164326.9, dated Oct. 2, 2020; 9 pages.

EPO; Extended European Search Report issued in EP Patent Application No. 20164636.1, dated Oct. 6, 2020; 8 pages.

EPO; Extended European Search Report issued in EP Patent Application No. 20168972.6, dated Jul. 3, 2020; 9 pages.

EPO; Extended European Search Report issued in EP Patent Application No. 20181907.5, dated Nov. 2, 2020; 9 pages.

EPO; Extended European Search Report issued in EP Patent Application No. 20193625.9, dated Feb. 22, 2021; 7 pages.

EPO; Extended European Search Report issued in Patent Application No. EP 20163518.2, dated Aug. 19, 2020; 10 pages.

EPO; Extended European Search Report issued in Patent Application No. EP 20163661.0, dated Aug. 17, 2020; 9 pages.

Liljestrand, Hans, et al., "PAC it up: Towards Pointer Integrity using ARM Pointer Authentication", accessed at https://arxiv.org/pdf/1811.09189.pdf, last updated May 24, 2019, 21 pages.

The Electronics Resurgence Initiative, "SSITH: TA1 (Hardware) Performers", accessed at: https://eri-summit.darpa.mil/docs/ERIPoster_Applications_SSITH_DARPA.pdf, Mar. 20, 2020, 1 page.

Watson, Robert N.M., et al., "An Introduction to CHERI", Technical Report UCAM-CL-TR-941, University of Cambridge Computer Labratory, Cambridge, United Kingdom, Sep. 2019, 43 pages.

Xu, Leslie et al., "White Paper, Securing the Enterprise with Intel AES-NI, Intel Advanced Encryption Standard New Instructions (AES-NI)," Intel Corporation, Version, 2.0, Sep. 2010 (13 pages).

Bernstein, Daniel J., "Gimli," Sep. 27, 2019, retrieved from https://csrc.nist.gov/CSRC/media/Projects/lightweight-cryptography/documents/round-2/spec-doc-rnd2/gimli-spec-round2.pdf, (48 pages).

BiiN, "CPU Architecture Reference Manual", accessed at http://bitsavers.informatik.uni-stuttgart.de/pdf/biin/BiiN_CPU_Architecture_Reference_Man_Jul88.pdf, Jul. 1988, 401 pages.

Boivie, Rick, IBM Research Report, SecureBlue++: CPU Support for Secure Execution, May 23, 2012, available online at https://domino.research.ibm.com/library/cyberdig.nsf/papers/E605BDC5439097F085257A13004D25CA/$File/rc25287.pdf, (10 pages).

(56) References Cited

OTHER PUBLICATIONS

Dworkin, Morris, "Recommendation for Block Cipher Modes of Operation: The XTS-AES Mode for Confidentiality on Storage Devices," NIST Special Publication 800-38E, Jan. 2010, available online at https://nvlpubs.nist.gov/nistpubs/Legacy/SP/nistspecialpublication800-38e.pdf, (12 pages).
Gallagher, Mark et al., "Morpheus: A Vulnerability-Tolerant Secure Architecture Based on Ensembles of Moving Target Defenses with Churn," ASPLOS '19, Apr. 13-17, 2019, pp. 469-484, available online at https://web.eecs.umich.edu/~barisk/public/morpheus.pdf, (16 pages).
Gallagher, Mark, Slide Deck entitled "Morpheus: A Vulnerability-Tolerant Secure Architecture Based on Ensembles of Moving Target Defenses with Churn," ASPLOS '19, Apr. 13-17, 2019, retrieved from https://twd2.me/wp-content/uploads/2019/05/Morpheus-1.pdf, (45 pages).
Intel 64 and IA-32 Architectures Developer's Manual, vol. 3A: System Programming Guide, Part 1, retrieved from https://www.intel.com/content/www/us/en/architecture-and-technology/64-ia-32-architectures-software-developer-vol-3a-part-1-manual.html, (468 pages).
Intel® 64 and IA-32 Architectures Software Developer's Manual, vol. 2B: Instruction Set Reference, M-U, Sep. 2016, retrieved from https://www.intel.com/content/dam/www/public/us/en/documents/manuals/64-ia-32-architectures-software-developer-vol-2b-manual.pdf, (706 pages).
Intel® 64 and IA-32 Architectures Software Developer's Manual, vol. 3D: System Programming Guide, Part 4, Sep. 2016, 224 pages, retrieved from https://www.intel.com/content/dam/www/public/us/en/documents/manuals/64-ia-32-architectures-software-developer-vol-3d-part-4-manual.pdf, (224 pages).
Liljestrand, Hans et al. "PACStack: an Authenticated Call Stack," Sep. 3, 2019, retrieved from https://arxiv.org/pdf/1905.10242.pdf, (20 pages).
Qualcomm Technologies, Inc., "Pointer Authentication on ARMv8.3, Design and Analysis of the New Software Security Instructions," Jan. 2017, retrieved from https://www.qualcomm.com/media/documents/files/whitepaper-pointer-authentication-on-armv8-3.pdf, (12 pages).
Savry, Olivier, et al., "Intrinsec, an Intrinsically Secure Processor", RISC V Workshop, Dec. 6, 2019, accessed at: http://riscv.org/wp-content/uploads/2019/06/16.15-CEA-RISC-V-Workshop-Zurich.pdf, (15 pages.).
Serebryany, Kostya, "ARM Memory Tagging Extension and How it Improves C/C++ Memory Safety," Summer 2019, (5 pages).
The Electronics Resurgence Initiative, "SSITH: TA1 (Hardware) Performers," Dec. 22, 2018, available online at https://eri-summit.darpa.mil/docs/ERIPoster_Applications_SSITH_DARPA.pdf, (1 page).
Watson, Robert N.M., et al., "CHERI: A Hybrid Capability-System Architecture for Scalable Software Compartmentalization", 2015 IEEE Symposium on Security and Privacy, May 2015, accessed at https://discovery.ucl.ac.uk/id/eprint/1470067/1/oakland15cheri.pdf, 18 pages.
USPTO Non-Final Office Action in U.S. Appl. No. 16/740,359 dated Sep. 27, 2021 (8 pages).
EPO; Extended European Search Report issued in EP Patent Application No. 21195529.9, dated Mar. 1, 2022; 6 pages.
EPO; Extended European Search Report issued in EP Patent Application No. 21196104.0, dated Feb. 15, 2022; 10 pages.
USPTO Notice of Allowance in U.S. Appl. No. 16/722,707 dated Mar. 28, 2022 (10 pages).
USPTO Notice of Allowance in U.S. Appl. No. 16/724,105 dated Mar. 31, 2022 (8 pages).
USPTO Notice of Allowance in U.S. Appl. No. 16/740,359 dated Mar. 22, 2022 (9 pages).
USPTO Supplemental Notice of Allowance in U.S. Appl. No. 16/722,707 dated Apr. 8, 2022 (5 pages).
USPTO Notice of Allowance in U.S. Appl. No. 16/776,467 dated Jul. 18, 2022 (10 pages).
USPTO Non-Final Office Action in U.S. Appl. No. 17/134,405 dated Aug. 1, 2022 (15 pages).
USPTO Non-Final Office Action in U.S. Appl. No. 16/723,871 dated Nov. 10, 2022 (11 pages).
USPTO Notice of Allowance in U.S. Appl. No. 16/776,467 dated Nov. 9, 2022 (8 pages).
Nasahl, Pascal et al., "CrypTag: Thwarting Physical and Logical Memory Vulnerabilities using Cryptographically Colored Memory", https://doi.org/10.48550/arXiv.2012.06761, ARXIV ID: 2012.06761, Dec. 12, 2020. (13 pages).
Luck, Nathan et al., "Hardware and Binary Modification Support for Code Pointer Protection From Buffer Overflow," 37th International Symposium on Microarchitecture (MICRO-37'04), 2004, pp. 209-220 (12 pages).
USPTO Final Office Action in U.S. Appl. No. 16/724,059 dated Sep. 2, 2022 (34 pages).
USPTO Non-Final Office Action in U.S. Appl. No. 16/722,342 dated Aug. 29, 2022 (14 pages).
USPTO Notice of Allowance in U.S. Appl. No. 16/724,026 dated Aug. 10, 2022 (9 pages).
USPTO Notice of Allowance in U.S. Appl. No. 17/134,406 dated Oct. 5, 2022 (10 pages).
Whelihan, David et al., "A Key-Centric Processor Architecture for Secure Computing," 2016 IEEE International Symposium on Hardware Oriented Security and Trust (HOST), 2016, pp. 173-178. (6 pages).
Zhu, Ge et al., "Protection against indirect overflow attacks on pointers," Second IEEE International Information Assurance Workshop, 2004. Proceedings., 2004, pp. 97-106 (10 pages).
USPTO Notice of Allowance in U.S. Appl. No. 16/724,026 dated Dec. 7, 2022 (14 pages).

\* cited by examiner

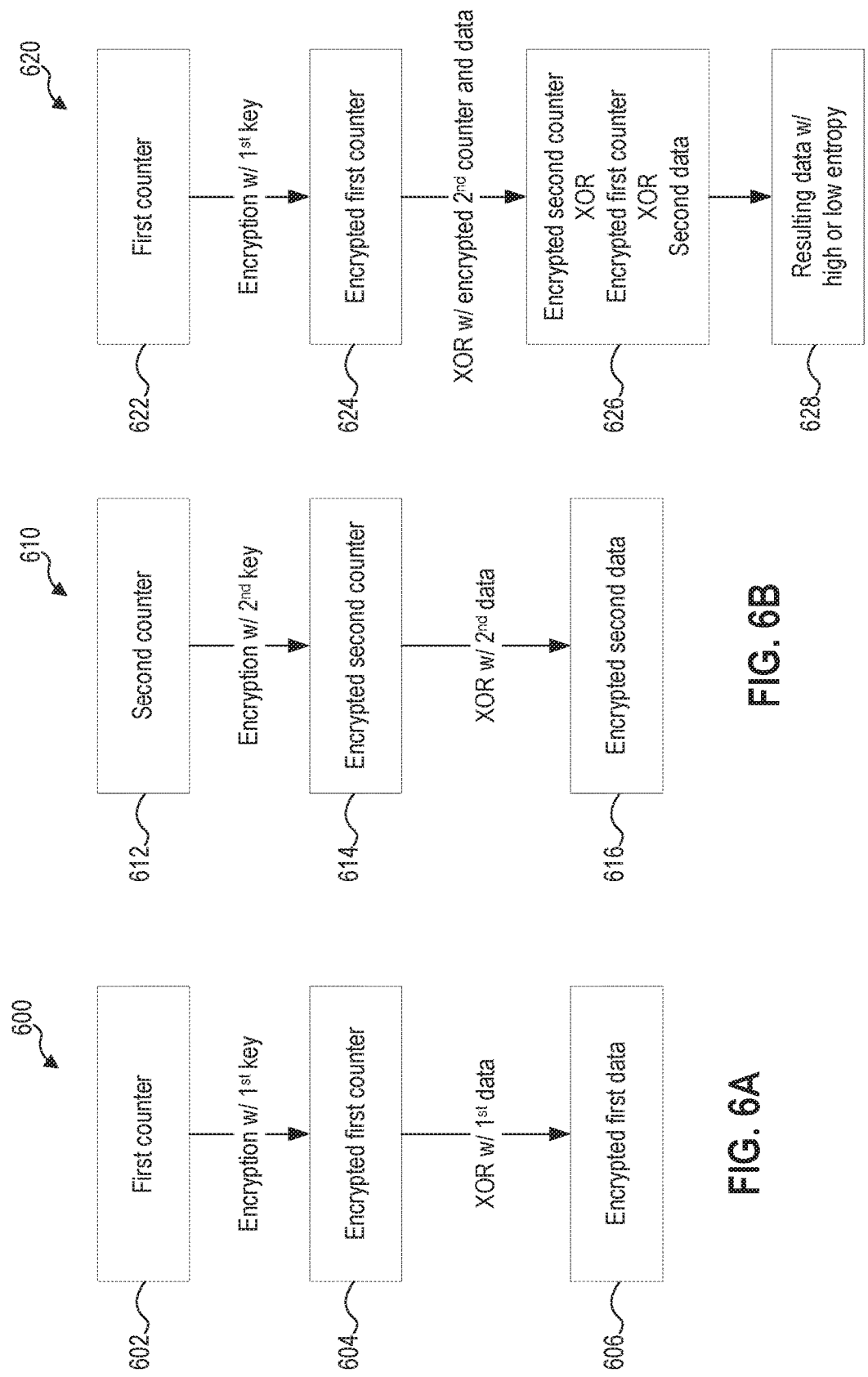

US 11,580,234 B2

IMPLICIT INTEGRITY FOR CRYPTOGRAPHIC COMPUTING

CROSS-REFERENCE TO RELATED APPLICATIONS

This application claims the benefit of and priority from U.S. Provisional Patent Application No. 62/868,884 entitled "Cryptographic Computing" and filed Jun. 29, 2019, the entire disclosure of which is incorporated herein by reference.

TECHNICAL FIELD

This disclosure relates in general to the field of computer systems and, more particularly, to implicit integrity checks in cryptographic computing implementations.

BACKGROUND

Cryptographic computing may refer to solutions for computer system security that employ cryptographic mechanisms inside processor components. Some cryptographic computing systems may employ encryption and/or other cryptographic mechanisms inside a processor core on memory pointers or user data before such data leave the processor boundary and enter some external memory unit or are communicated to some device. Furthermore, encryptions and decryptions may be part of memory load and store operations. Such flexible encryption operations can substantially reduce the typical overheads associated with current solutions such as accessing tables with permissions, memory ranges or other security metadata, as such tables may be large, stored in external memory units, and be time consuming to access.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which:

FIGS. 6A-6C are diagrams illustrating how implicit integrity detects corruptions in the processor core when a counter mode block cipher is employed.

DETAILED DESCRIPTION

Figure 1:
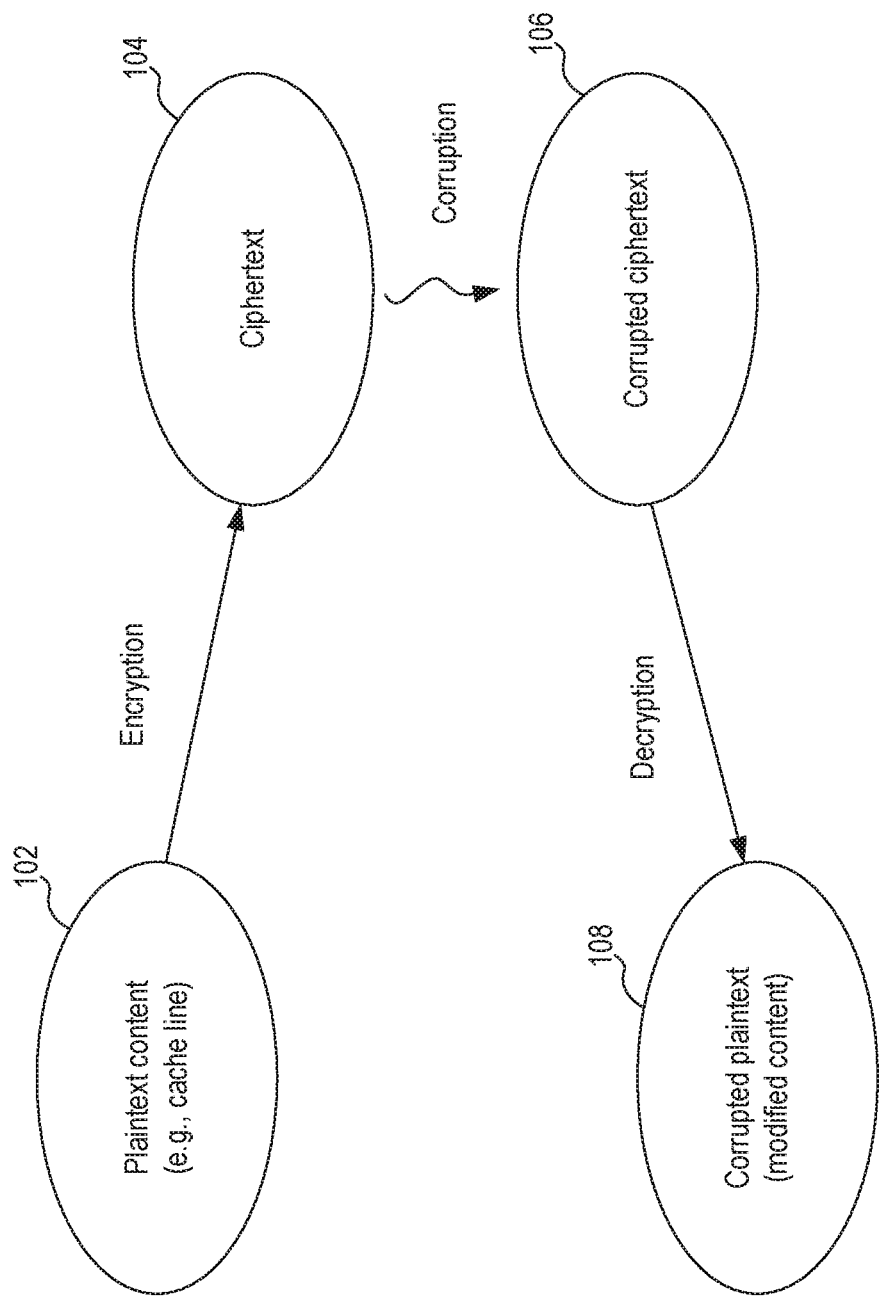
FIG. 1 is a simplified diagram of example data corruption occurring in encrypted data.

The following disclosure provides various possible embodiments, or examples, for implementation of cryptographic computing. Cryptographic computing may refer to solutions for computer system security that employ cryptographic mechanisms inside processor components. Some cryptographic computing systems may employ encryption and/or other cryptographic mechanisms inside a processor core on memory pointers or user data before such data leave the processor boundary and enter some external memory unit or are communicated to some device. Such flexible encryption operations can substantially reduce the typical overheads associated with current solutions such as accessing tables with permissions, memory ranges or other security metadata, as such tables may be large, stored in external memory units, and be time consuming to access.

Data integrity is an important aspect of computing. Data corruption may occur in various instances, and detection of any data corruption can prevent many issues. In some current systems, corruption detection is implemented by producing, storing, and validating Message Authentication Codes (MACs) such as K-MAC SHA3 codes, which are cryptographically strong. However, there is a cost in terms of space and compute power associated with the use of the additional metadata related to the use of MACs, and the cost may be substantially increased if memory load and store operations perform the cryptographic art of the processing in the processor core (such as in cryptographic computing implementations). For example, each cache line and register needs to be augmented with space for storing a MAC. Such computation cost may need to be included in the overall delay of the compute pipeline, etc.

Aspects of the present disclosure may detect data corruption while avoiding some of the disadvantages of current techniques (e.g., the costs described above with respect to the use of MACs). In some embodiments, for example, corruption detection can be supported at the processor core in the context of cryptographic computing, and as part of encrypted memory load and store operations, by using implicit integrity checks. The principle behind implicit integrity can generally be described as follows. User data is typically of low entropy and usually demonstrates patterns (e.g., a number of equal bytes exceeding a threshold may be present in the data, or the number of two highest nibble frequencies may exceed a threshold, etc.). Where data is encrypted, corruptions on the ciphertext may result in decrypted plaintexts without the patterns. By checking for patterns or for the low entropy status of some decrypted content, data corruption may be detected. In some embodiments, implicit integrity checks can be supported in the processor core by updating a processor state (which is accessible by software) when data is decrypted in the core to indicate potential data corruption. The software may be able to react to the potential data corruption/integrity violations by reading the relevant processor state information. In certain embodiments, a processor state, such as a new bit in the flag register, may be utilized to indicate integrity violations, and new instructions (e.g., branch instructions) may react the flag bit. The instructions may be part of an instruction set architecture (ISA) of a processor.

In some embodiments, implicit integrity checks may be used for detecting corruption after the completion of encrypted memory read operations where encryption occurs inside as processor (e.g., in a processor core). In some embodiments, a new processor state that specifies whether decrypted data is of low entropy may be implemented by an entropy flag (EF), by information about patterns, thresholds or entities exhibiting the patterns (e.g. stored in a model specific register (MSR)), or by information about exhibited entropy index values. Further, in some embodiments, implicit integrity may be implemented in a processor together with encryption modes, such as a counter mode.

FIG. 1 is a simplified diagram of example data corruption occurring in encrypted data. In the example shown, some plaintext content 102 exists. The plaintext content 102 may include any suitable type of data, such as, for example, a cache line or other type of data that may be used within a processor. If the plaintext content 102 patterns (i.e., has low entropy), then such content can be distinguished from random data. When the plaintext content 102 is encrypted (where the encryption algorithm approximates a random oracle), a ciphertext 104 is produced, which is no longer distinguishable from random data. Any corruption on the ciphertext 104 results in a corrupted ciphertext 106, which is different from the original ciphertext 104. Any subsequent decryption operation on the corrupted ciphertext 106 will result in a corrupted plaintext value 108 that is different from the original plaintext content 102.

As decryption is the inverse operation of encryption, the decryption algorithm also approximates a random oracle. Because of this, the corrupted plaintext 108 is also indistinguishable from random data. Furthermore, the corrupted plaintext 108 is indistinguishable from random data due to an 'avalanche effect' associated with the decryption oracle. Even a single bit change in the ciphertext 104 affects all bits of the decrypted plaintext (e.g., 108). For these reasons, checking the entropy of the result of a decryption operation can be a reliable test for detecting corruption. This methodology may be referred to as implicit integrity.

In the context of cryptographic computing, implicit integrity may be particularly important because memory load and store operations encrypt the data just before exiting the CPU core, and before entering the Level-1 (L1) cache (or other part of the memory hierarchy), and similarly decrypt data as they enter the CPU core. Implicit integrity allows the CPU core to seamlessly detect corruption on the data by performing a decryption operation and checking the entropy of the decrypted content. This is a low-cost operation, incurring nowhere near the cost of the MAC approach described above.

Figure 2:
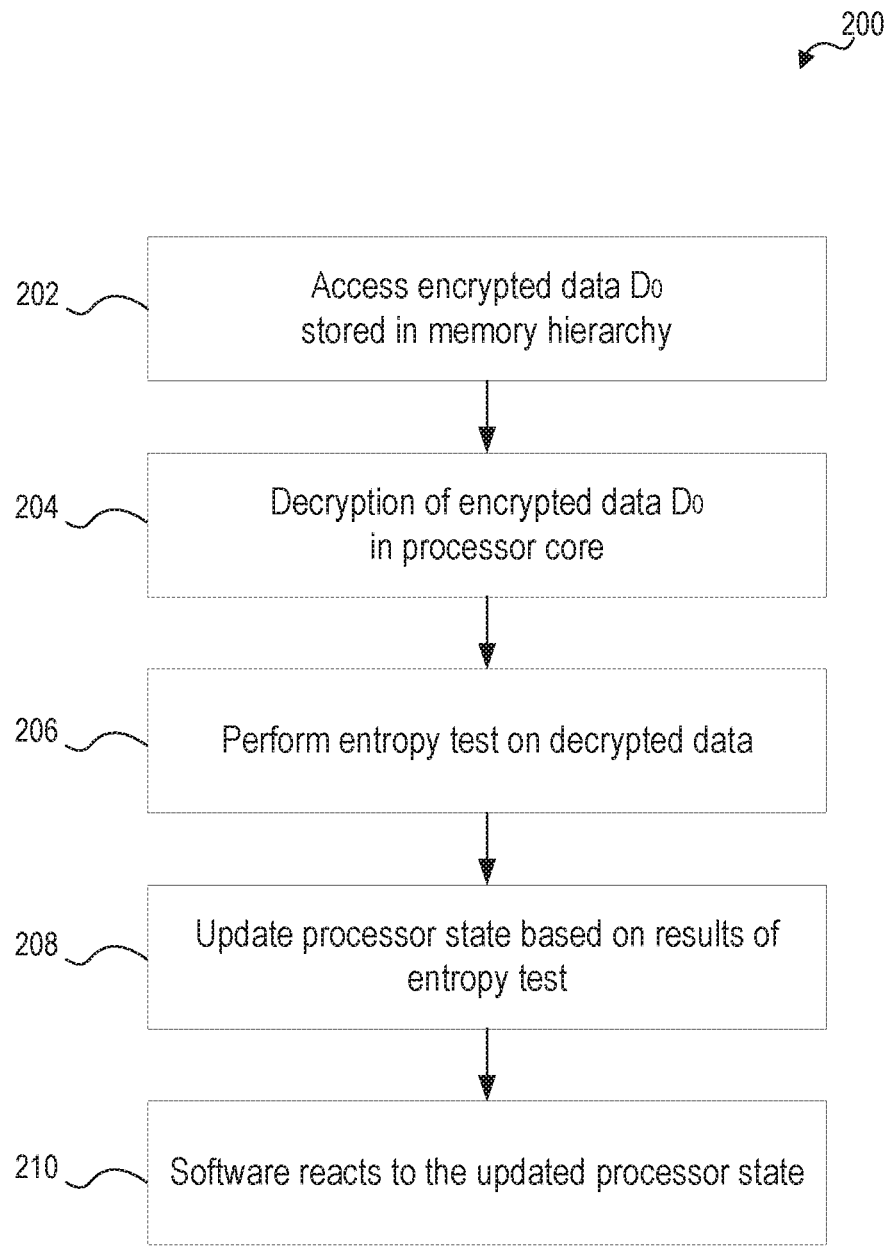
FIG. 2 is a simplified flow diagram of an example process for implementing implicit integrity.

FIG. 2 is a simplified flow diagram of an example process 200 for implementing implicit integrity. One or more operations of the example process 200 may be implemented in a processor (e.g., in a processor core) to detect, in a low-cost manner, whether data stored in memory has been corrupted or is likely to be corrupted.

At 202, encrypted data $D_0$ stored in a memory hierarchy is accessed by a processor core. The encrypted data $D_0$ may reside anywhere in the memory hierarchy, such as, for example, inside a Level-1 (L1) cache, Level-2 (L2) cache, or Level-3 (L3) cache of a processor, or in memory outside of the processor.

At 204, the encrypted data $D_0$ is decrypted in the processor core. For example, in some embodiments, the encrypted data may be decrypted as it is read from memory and enters the processor core. After the data has been decrypted, an entropy test is performed on the decrypted data at 206. The entropy test may check for one or more patterns in the decrypted data and make a determination as to whether the decrypted data is of low entropy. For example, in one embodiment, the processor core may check whether there are 4 or more 16-bit words that are equal to each other (e.g., among a set of 32 words). Other example pattern checks and associated operations are described below with respect to the processes 300 and 400 or FIGS. 3 and 4, respectively.

Once the entropy test completes, a processor state is updated at 208 based on the results of the entropy test. In some embodiments, the processor state may be implemented by one or more bits in a processor register and an output of the entropy test (e.g., an indication as to whether the decrypted data is of low entropy) may be used to update the bits of the register. For example, in one embodiment, a single bit in a CPU flag register may get updated, such as by being set to 1, based on high entropy being detected in the decrypted data and an associated indication being output by the entropy test at 206. In some embodiments, to represent the entropy of the decrypted data in the CPU core state, information may be stored about the exact pattern demonstrated by the data (e.g., whether it is equality of bytes, words or nibbles) and the number of entities in the data demonstrating the pattern. In some embodiments, a measure of entropy suitable for small messages called an "entropy index" may be computed and stored as discussed below.

Finally, at 210, software executing on the processor may read the register value(s) and react accordingly. For example, software may execute a branch instruction to begin executing a sequence of instructions that reset the application. Such reset may be required if software considers the detected implicit integrity violations as signs of a significant security breach. Reset steps may include changing pointer and data encryption keys, re-encrypting the entire application state, including both code and data, resetting the content of the corrupted data structures to default values, or any other suitable steps.

Figure 3:
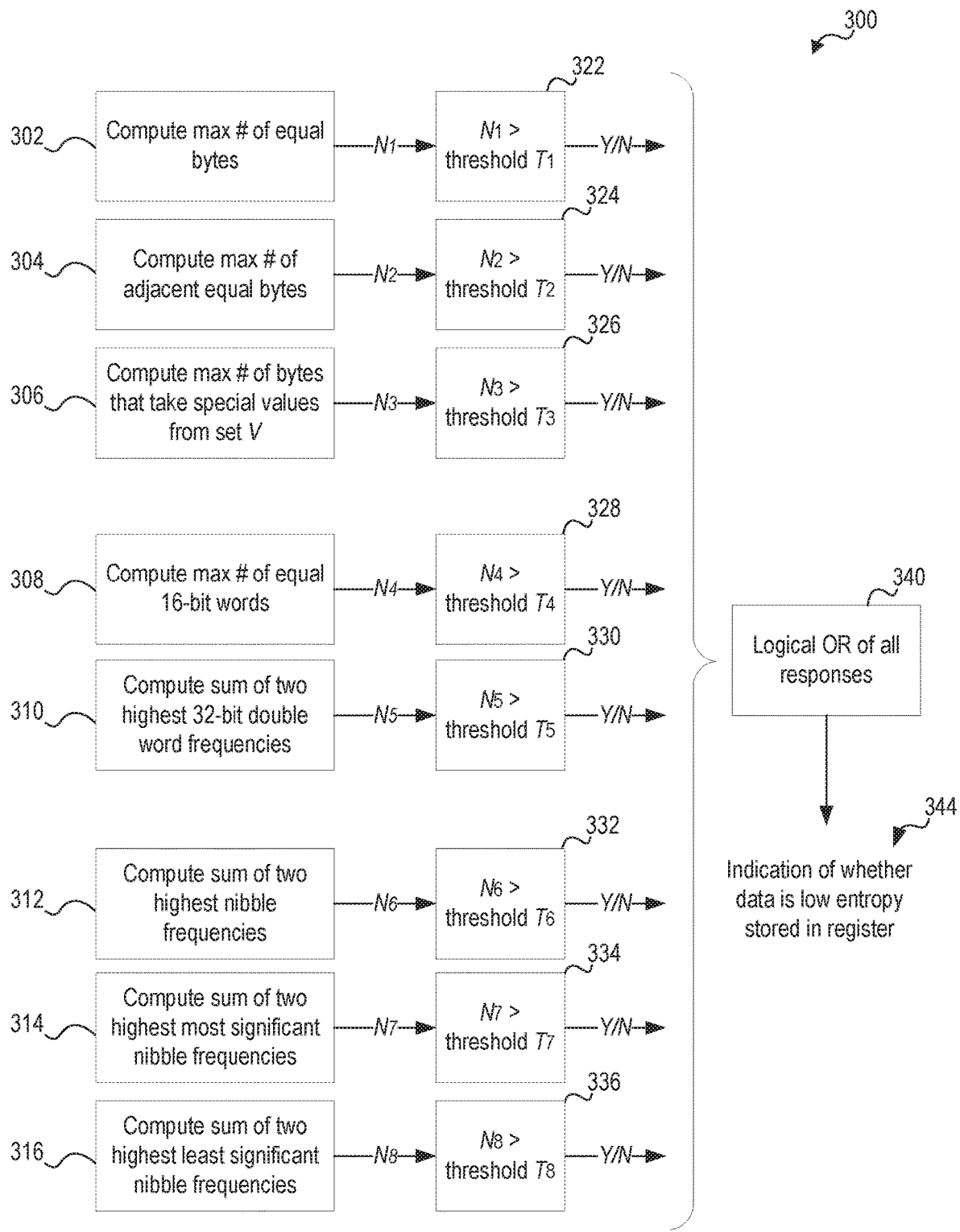
FIG. 3 is a simplified diagram illustrating of an example process for determining whether decrypted data is of high or low entropy.

FIG. 3 is a simplified diagram illustrating of an example process 300 for determining whether decrypted data is of high or low entropy. In the example shown, the process 300 performs a plurality of pattern checks using a set of thresholds $\{T_1, T_2, \ldots\}$. The example process 300 is one variant of an algorithm that may be referred to as "Extended Pattern Matching" (EPM), which employs different styles of pattern checks to determine whether a data set is of high or low entropy. When combined, these pattern checks can result in a successful scheme for implicit integrity. The example process 300 is described as an entropy test performed on decrypted data (e.g., as part of operation 204 of FIG. 2), but may be applied to any type of data to perform an entropy test.

In the example process 300, decrypted data goes through parallel pattern checks. A first pattern check determines, in operation 302, a number of bytes ($N_1$) in the decrypted data that are equal to one another and compares the number of equal bytes to a first threshold $T_1$ in operation 322. A second pattern check determines, in operation 304, a maximum number of adjacent bytes ($N_2$) that are equal to one another and compares the number of adjacent equal bytes to a second threshold $T_2$ in operation 324. The second pattern check concerns entities among the input data which are not only equal to each other, but are also placed in continuous index positions. This second pattern check is not necessarily the same as the first pattern check. For example, one can associate these two types of pattern checks with different thresholds and, by doing so, build two different pattern detectors.

A third pattern check determines, in operation 306, a number of bytes ($N_3$) that are equal to a special value of a set (V) of special values and compares the number to a third threshold $T_3$ in operation 326. The set of special values (i.e., the set V) may include values that are frequently encountered in regular user data but are infrequently encountered in random or corrupted plaintext data. For example, in some instances, memory cache lines obtained from client data workloads may include a high percentage of bytes having values of 0x00 or 0xFF. Although the first, second, and third pattern checks are described above with respect to bytes in decrypted data, these pattern checks may be performed with respect to a different type of data entity, such as, for example nibbles, words (16-bit), double words (32-bit), or another type of data entity. Such checks on different types of data entities may be performed in lieu of the first, second, or third pattern checks, or in addition to them. For instance, in the example shown, a fourth pattern check determines, in operation 308, a number of 16-bit words ($N_4$) in the decrypted data that are equal to one another and compares the number to a fourth threshold $T_4$ in operation 328.

Another type of pattern check detects data entities the value histogram of which demonstrates a sum of n highest entries (i.e., frequencies) being higher than a threshold. The intuition behind this type of pattern check is that there are several types of input messages, the content of which is not as random as that of encrypted data, but also does not demonstrate patterns at the byte or word granularity. One example of such content is media data, where nibble values may be replicated, but where the data do not demonstrate significant byte or word replications. An alternative pattern check that computes whether the sum of the n highest nibble frequencies exceeds a threshold is more efficient. If the input data consist of cache lines, this pattern check works best for n=2. This type of pattern check can be seen in the pattern checks of FIG. 3 that include operations 310, 312, 314, 316.

For example, in operation 310, a sum of the two highest 32-bit double word frequencies is determined ($N_5$) and the sum is compared to a fifth threshold $T_5$ in operation 330. As another example, the operation 312 determines a sum of the two highest nibble frequencies ($N_6$) and the sum is compared with a sixth threshold $T_6$ in operation 332. In some embodiments, this concept can be extended to look at most and least significant entities as well. As an example, the operation 314 determines a sum of the two highest most significant nibble frequencies ($N_7$) and the sum is compared with a seventh threshold $T_7$ in operation 334. As another example, the operation 316 determines a sum of the two highest least significant nibble frequencies ($N_8$) and the sum is compared with an eight threshold $T_8$ in operation 336. By combining these types of pattern checks, a more flexible pattern detector can be implemented, which on the one hand encompasses significantly more regular user inputs and on the other hand is associated with an event that is infrequent among random data.

Each pattern check shown in FIG. 3 produces a yes/no (Y/N) determination, and the outputs of the pattern checks may then be analyzed to make a determination of whether the decrypted data is of high or low entropy. For instance, in the example shown, each of the threshold comparisons 322, 324, 326, 328, 330, 332, 334, 336 produces a bit-value of 1 for yes (e.g., where the determined number exceeds the relevant threshold) or 0 for no (e.g., where the determined number does not exceed the relevant threshold). The bit-values output by each pattern check may make up a bit vector indicating which of the 8 patterns are found in the data. For instance, using the example process 300, the outputs of the operations 322, 324, 326, 328, 330, 332, 334, 336 may form a vector of eight Boolean values. These values may be provided to a logical OR operation 340, and the result 344 of this logical OR operation may be an indication on whether the decrypted data input to the process 300 is of low entropy or not. The indication could be implemented as a single bit value set in the processor flag register in some instances. Thus, the process 300 of FIG. 3 essentially determines whether there exists at least one pattern check from among the set of pattern checks employed in which the observed data entities that exhibit the pattern exceed a threshold. If such a pattern check exists, the input data to the process 300 is characterized as being of low entropy; otherwise, it is not. In some embodiments, the processor state may also include, in addition to the pattern bit vector described above, the numbers of entities demonstrating each of the type of pattern (e.g., $N_1, N_2, N_3, N_4, N_5, N_6, N_7, N_8$ shown in FIG. 3).

Figure 4:
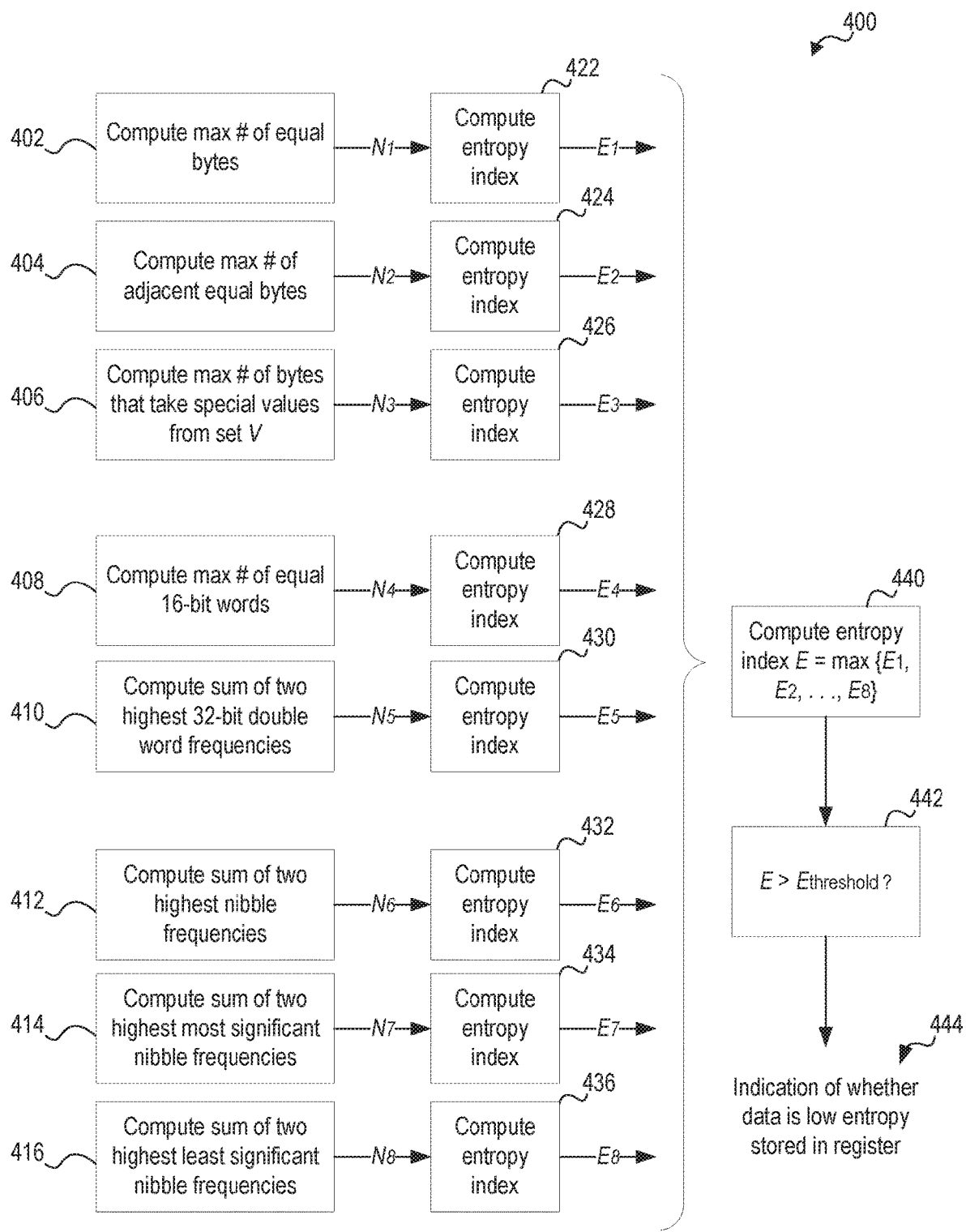
FIG. 4 is a simplified diagram of another example process for determining whether decrypted data is of high or low entropy.

FIG. 4 is a simplified diagram of another example process 400 for determining whether decrypted data is of high or low entropy. The example process 400 is an extension of the Extended Pattern Matching process 300 that does not include the use of thresholds. In particular, the process 400 computes the number of entities that exhibit a pattern in some decrypted data (N in FIG. 4 determined by operations 402, 404, 406, 408, 410, 412, 414, 416) in a similar fashion to the process 300 of FIG. 3, but instead of comparing these numbers to thresholds as in process 300, the process 400 determines 'entropy index' values (E in FIG. 4 determined by operations 422, 424, 426, 428, 430, 432, 434, 436) based on the determined numbers. The following description defines an example entropy index that may be implemented in the process 400.

Consider a pattern p of type π (e.g., maximum number of bytes being equal as in 402 of FIG. 4). If some input data x demonstrates pattern p and exactly N entities from x exhibit this pattern (e.g., the maximum number of bytes being equal is exactly N) we denote this as:

$$x \in p(\pi, N)$$

An entropy index value E associated with the pattern type π and entity number E as can then be defined as the negative logarithm of the probability that $x \in p(\pi, N)$ given that x is random (e.g., x is obtained from the output of a random oracle):

$$E(\pi, N) = -\log_2 Pr(x \in p(\pi, N) | x \text{ is random})$$

According to the example definition above, the probability of seeing the pattern p(π, N) in a random data value x is equal to $2^{-E}$. In this example, the entropy index E is measured in bits. Furthermore, the expected number of random values to be inspected until one is found that demonstrates the pattern p(π, N) is $2^E$. As a result, the entropy index E associated a pattern type π and an entity number N is also equal to the logarithm of the expected number of random values to bed inspect until a value xis found such that $x \in p(\pi, N)$.

The example process 400 of FIG. 4 employs the same pattern checks as the process 300 of FIG. 3 with one exception: the pattern checks of the process 400 do not return Boolean responses; rather, they return the numbers of the entities that exhibit patterns $\{N_1, N_2, \ldots, N_8\}$. Each of these numbers is then used to determine a corresponding entropy index value $\{E_1, E_2, \ldots, E_8\}$. The computation of every entropy index value depends on the type of the pattern check used and on the number of entities that exhibit the pattern in the data. Some examples of how entropy index values can be computed for different types of pattern checks are described below.

The entropy index values $\{E_1, E_2, \ldots, E_8\}$ obtained from the numbers $\{N_1, N_2, \ldots, N_8\}$ undergo a processing stage 440 that selects the maximum of the entropy index values ($E = \max(\{E_1, E_2, \ldots, E_8\})$) and the maximum entropy index E is compared with a threshold ($E_{threshold}$) at 442. If the maximum entropy index E exceeds the threshold, then the decrypted data input to the process 400 is characterized as demonstrating low entropy; otherwise, it is characterized as high entropy. This characterization can then be provided as an indication 444 in a similar manner as described above with respect to the indication 322 of FIG. 3.

The process 400 can be said to essentially search for the rarest of the patterns that are exhibited by the decrypted data input to the process. The rarest of the patterns is the one that appears with the smallest probability among random data and is associated with the highest entropy index value. As the entropy index values $\{E_1, E_2, \ldots, E_8\}$ are determined from the numbers $\{N_1, N_2, \ldots, N_8\}$, the process 400 does not need to directly operate on separate thresholds that characterize the data entities exhibiting the patterns as in process 300. Instead, the process 400 operates on a single entropy index threshold ($E_{threshold}$), which has practical significance. For instance, this threshold may reflect the expected number of efforts required by an adversary to produce at least one of the patterns considered in the process 400 by corrupting plaintext data. Such probability is associated with the highest entropy index value.

Entropy Index for Byte and Word Equality Pattern Checks

The following computations may be used to determine an entropy index for byte and word equality pattern checks (e.g., the entropy indices determined by operations 422, 428 of FIG. 4 based on the pattern checks of operations 402, 408, respectively). Byte and word equality checks may be applicable to the protection of memory and storage data because many data units in computing systems contain code or data structures which demonstrate significant byte or word value replications. An example entropy index E associated with a data unit consisting of n bytes demonstrating m bytes being equal to each other is given by:

$$E \cong -\log_2\left(\binom{n}{m}\left(\frac{1}{256}\right)^{m-1}\cdot\left(1-\frac{1}{256}\right)^{n-m}\right)$$

Similarly, an example entropy index E associated with a data unit consisting of n 16-bit words demonstrating m words being equal to each other is given by:

$$E \cong -\log_2\left(\binom{n}{m}\left(\frac{1}{65536}\right)^{m-1}\cdot\left(1-\frac{1}{65536}\right)^{n-m}\right)$$

For an adversary to successfully attack the byte or the word equality pattern detector, the adversary would need to produce corrupted plaintext data demonstrating m or more equal byte/word values. In random data, such equalities are observed with probability computed as the birthday collision probability associated n elements, m collisions and 256 (for bytes) or 65536 (for words) birthdays. Such probability can be approximated in many ways, for example according to the following:

$$p^{(birthday\text{-}collision\text{-}bytes)}(n, m) \cong$$

$$1 - \prod_{i=0}^{n-1}\sum_{j=0}^{m-2}\binom{n-i-1}{j}\cdot\left(\frac{1}{256}\right)^j\cdot\left(\frac{255}{256}\right)^{n-i-j-1}$$

$$p^{(birthday\text{-}collision\text{-}words)}(n,$$

$$m) \cong 1 - \prod_{i=0}^{n-1}\sum_{j=0}^{m-2}\binom{n-i-1}{j}\cdot\left(\frac{1}{65536}\right)^j\cdot\left(\frac{65535}{65536}\right)^{n-i-j-1}$$

These birthday collision probabilities are slightly higher than the probability values $2^{-E}$ associated with the entropy index values given above. This is because these birthday collision probabilities include all events where there are more than m values being equal in a data unit.

Entropy Index for Adjacent Byte Equality Pattern Checks

The following computations may be used to determine an entropy index for adjacent byte equality pattern checks (e.g., the entropy index determined by operation 424 of FIG. 4 based on the pattern check of operation 404). Pattern checks that compute the number of bytes that are equal to each other and occupy continuous index positions are also important. Such checks may be successful not only on data units that contain code and data structures but also on uninitialized memory entries, where a single arbitrary byte value may be repeating. An example entropy index E associated with a data unit consisting of n bytes demonstrating m bytes being adjacent and equal to each other is given by:

$$E \cong -\log_2\left((n-m+1)\left(\frac{1}{256}\right)^{m-1}\cdot\left(1-\frac{1}{256}\right)^{n-m}\right)$$

For an adversary to successfully attack the adjacent byte equality pattern detector, the adversary would need to produce corrupted plaintext data demonstrating m or more adjacent equal bytes. In random data, this can happen with probability:

$$p^{(adjacement\text{-}equal)}(n, m) \cong \sum_{i=m}^{n}(n-i+1)\left(\frac{1}{256}\right)^{i-1}\cdot\left(1-\frac{1}{256}\right)^{n-i}$$

which is slightly higher than the value $2^{-E}$ associated with the entropy index E, for the same reasons as discussed above.

Entropy Index for Pattern Checks that Count Bytes Taking Special Values

The following computations may be used to determine an entropy index for pattern checks that count a number of bytes taking special values (e.g., the entropy index determined by operation 426 of FIG. 4 based on the pattern check of operation 406). Pattern checks that count the maximum number of bytes that take special values from a set V can successfully characterize code, data structures, and uninitialized memory entries. In one embodiment, a set V consists of two special values: 0x00 and 0xFF. Such values are frequently encountered in memory cache line data. An example entropy index E associated with a data unit consisting of n bytes where m bytes take values from a set V of cardinality |V| is given by:

$$E = -\log_2\left(\binom{n}{m}\left(\frac{|V|}{256}\right)^m\cdot\left(1-\frac{|V|}{256}\right)^{n-m}\right)$$

For an adversary to successfully attack this pattern detector, the adversary would need to produce corrupted plaintext data demonstrating m or more bytes with special values. In truly random data, this can happen with probability:

$$p^{(special-values)}(n, m) = \sum_{i=m}^{n} \binom{n}{i} \left(\frac{|V|}{256}\right)^i \cdot \left(1 - \frac{|V|}{256}\right)^{n-i}$$

Entropy Index for Pattern Checks that Compute the Sum of the Two Highest Double Word Frequencies The following computations may be used to determine an entropy index for pattern checks that compute a sum of two highest double word frequencies (e.g., the entropy index determined by operation 430 of FIG. 4 based on the pattern check of operation 410). Pattern checks that compute the sum of the two highest double word frequencies may be applicable to memory pointer tables. In some cases, there may be several cache lines that do not exhibit significant byte or word replications but contain a few pairs (1-2) of identical 32-bit or 64-bit sequences. These cache lines may contain memory pointer tables. Having two pairs of the same 32-bit values appearing in a random cache line is a rare event and happens with probability $2^{-49.84}$. An example entropy index E associated with a data unit consisting of n double words, where the sum of the two highest double word frequencies is equal to m is given by:

$$E \cong -\log_2\left(\sum_{i=1}^{n} \sum_{\substack{j=1, \\ i+j=m}}^{n} \binom{n}{i}\left(\frac{1}{2^{32}}\right)^{i-1} \cdot \binom{n-i}{j}\left(\frac{1}{2^{32}-1}\right)^{j-1}\right)$$

For an adversary to successfully attack this pattern detector, the adversary would need to produce corrupted plaintext data demonstrating double words for which the sum of the two highest frequencies is greater than, or equal to m. In truly random data, this happens with probability:

$$p^{(2-highest-feq-dwords)}(n, m) = \sum_{i=1}^{n} \sum_{\substack{j=1, \\ i+j\geq m, \\ i+j\leq n}}^{n} \binom{n}{i}\left(\frac{1}{2^{32}}\right)^{i-1} \cdot \binom{n-i}{j}\left(\frac{1}{2^{32}-1}\right)^{j-1}$$

As with all other cases, this probability is similar, but slightly higher than the value $2^{-E}$ as it includes all events where the sum of the two highest double word frequencies exceeds m.

Computation of the Entropy Index for Nibble-Based Pattern Checks

The following computations may be used to determine an entropy index for nibble-based pattern checks (e.g., the entropy indices determined by operations 432, 434, 436 of FIG. 4 based on the pattern checks of operations 412, 414, 416, respectively). Nibble-based patterns may apply to data units that are "semi-binary". Semi-binary data units may refer to data that do not exhibit patterns at the word or byte granularity but have entropy that is low enough so as to support corruption detection via implicit integrity. One example of such data is media data such as images, video frames, etc. Such data demonstrate nibble repetitions. The pattern checks discussed below compute the sum of the two highest nibble frequencies in a data unit. Three variants can be implemented in certain embodiments: one variant computes the sum of the two highest nibble frequencies using all nibbles of a data unit; a second variant computes the sum of the two highest nibble frequencies using only the most significant nibbles from the bytes of a data unit; and a third variant computes the sum of the two highest nibble frequencies using only the least significant nibbles from the bytes of a data unit.

An example entropy index E associated with a data unit consisting of n nibbles, where the sum of the two highest nibble frequencies is equal to m, is given by:

$$E \cong -\log_2\left(\sum_{i=1}^{n} \sum_{\substack{j=1, \\ i+j=m}}^{n} \binom{n}{i}\left(\frac{1}{16}\right)^{i-1}\left(\frac{15}{16}\right)^{n-i} \cdot \binom{n-i}{j}\left(\frac{1}{15}\right)^{j-1}\left(\frac{14}{15}\right)^{n-i-j}\right)$$

For an adversary to successfully attack this pattern detector, the adversary would need to produce corrupted plaintext data demonstrating nibbles for which the sum of the two highest frequencies is greater than, or equal to m. In random data, this happens with probability:

$$p^{(2-highest-feq-nibbles)} \cong$$
$$\sum_{i=1}^{n} \sum_{\substack{j=1, \\ i+j\geq m, \\ i+j\leq n}}^{n} \binom{n}{i}\left(\frac{1}{16}\right)^{i-1}\left(\frac{15}{16}\right)^{n-i} \cdot \binom{n-i}{j}\left(\frac{1}{15}\right)^{j-1}\left(\frac{14}{15}\right)^{n-i-j}$$

Figure 5A:
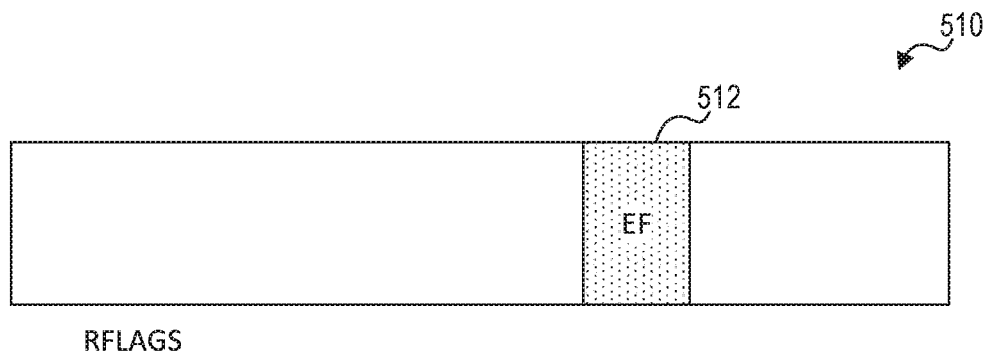
FIGS. 5A-5C are simplified diagrams of example embodiments of processor states supporting integrity checks in as processor according to the present disclosure.
Figure 5B:
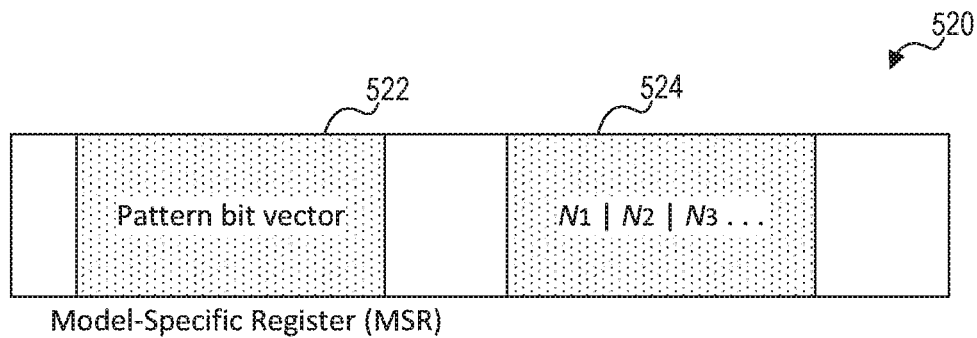
Figure 5C:
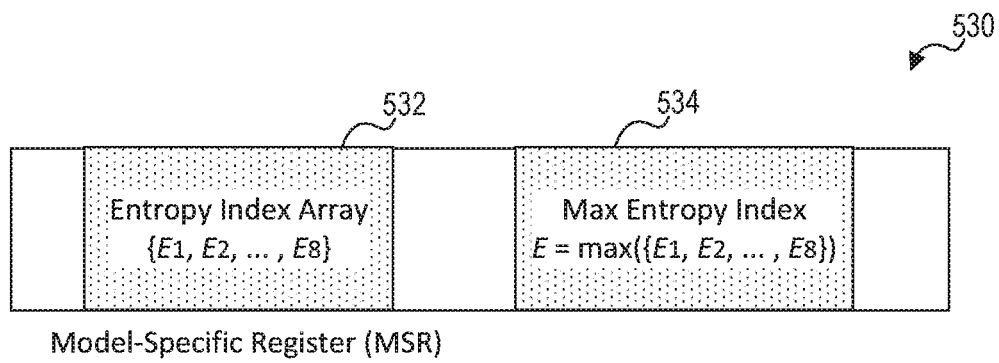

FIGS. 5A-5C are simplified diagrams of example embodiments of processor states supporting integrity checks in as processor according to the present disclosure. The processor state may be based on an output of the process 300 or the process 400, as described above. In the example shown in FIG. 5A, the processor state is maintained as a single bit state (implemented as an entropy flag (EF) 512) in the RFLAGS register 510 of a processor core. The register 510 may be a FLAGS register, an EFLAGS register, or another type of processor register in other embodiments. In the example shown in FIG. 5B, the processor state is maintained in a Model Specific Register (MSR) 520 as a pattern bit vector 522 that indicates the specific types of patterns exhibited by the data along with the number of entities 524 that participate in the pattern. For instance, referring to the example process 300 shown in FIG. 3, the pattern bit vector 522 may include the Boolean outputs from each the pattern check operations 302, 304, 306, 308, 310, 312, 314, 316, and the numbers determined by the pattern check operations (e.g., the number of bytes that are equal to one another for operation 302) may be stored in 524. In the example shown in FIG. 5C, a Model Specific Register (MSR) 530 maintains an array 532 of entropy index values as well as the maximum entropy index 534 exhibited by the data. For instance, referring to the example process 400 of FIG. 4, the entropy index array 532 may store the outputs of the operations 422, 424, 426, 428, 430, 432, 434, 436, while the maximum entropy index computed by operation 440 may be stored in 534. Other information may be stored in the MSRs of FIGS. 5B-5C in addition to, or in lieu of, the information shown.

FIGS. 6A-6C are diagrams illustrating how implicit integrity detects corruptions in the processor core when a counter mode block cipher is employed. In the example process 600 shown in FIG. 6A, a first counter value 602 is encrypted (e.g., as part of a regular encrypted write operation) with a first (correct) key to produce an encrypted first counter value 604 (first key stream), which is in turn XOR-ed with first data to produce the encrypted data 606. The encrypted data may be stored in an address owned by some software.

In the example process 610 shown in FIG. 6B, corruption of the data occurs. In particular, during a new write operation, a separate second counter value 612 is encrypted using a second (incorrect) key to produce an encrypted second counter value 614 (second key stream), which is in turn XOR-ed with new second data to produce encrypted second data 616. The encrypted first data 606 is replaced at the owned address by the encrypted second data 616.

The corruption occurring in the process 610 of FIG. 6B may be detected in the example process 620 shown in FIG. 6C. For instance, in the process 620, the first counter 622 is encrypted with the first key to produce the encrypted first counter 624 (first key stream) as in the process 600. However, now when software that owns the corrupted address reads from the address, the encrypted second data 616 stored at the address becomes XOR-ed with two different key streams: the first key stream that is associated with the first counter 602 of the process 600 (i.e., the legitimate access) and the second key stream that is associated with the second counter 612 of the process 610 (i.e., the corruption). If no corruption has occurred, the first and second key streams would cancel each other, and the correct data would be returned by the operation 626. In this case, the resulting data 628 would exhibit low entropy. However, if corruption has occurred, the resulting data 628 from operation 626 will exhibit high entropy. Thus, corruption may be detected based on detection of high entropy in the resulting data from operation 626.

The example processes described above may include additional or different operations, and the operations may be performed in the order shown or in another order. In some cases, one or more of the operations shown in the flow diagrams of FIGS. 2-4 and 6 are implemented as processes that include multiple operations, sub-processes, or other types of routines. In some cases, operations can be combined, performed in another order, performed in parallel, iterated, or otherwise repeated or performed another manner.

Figure 7:
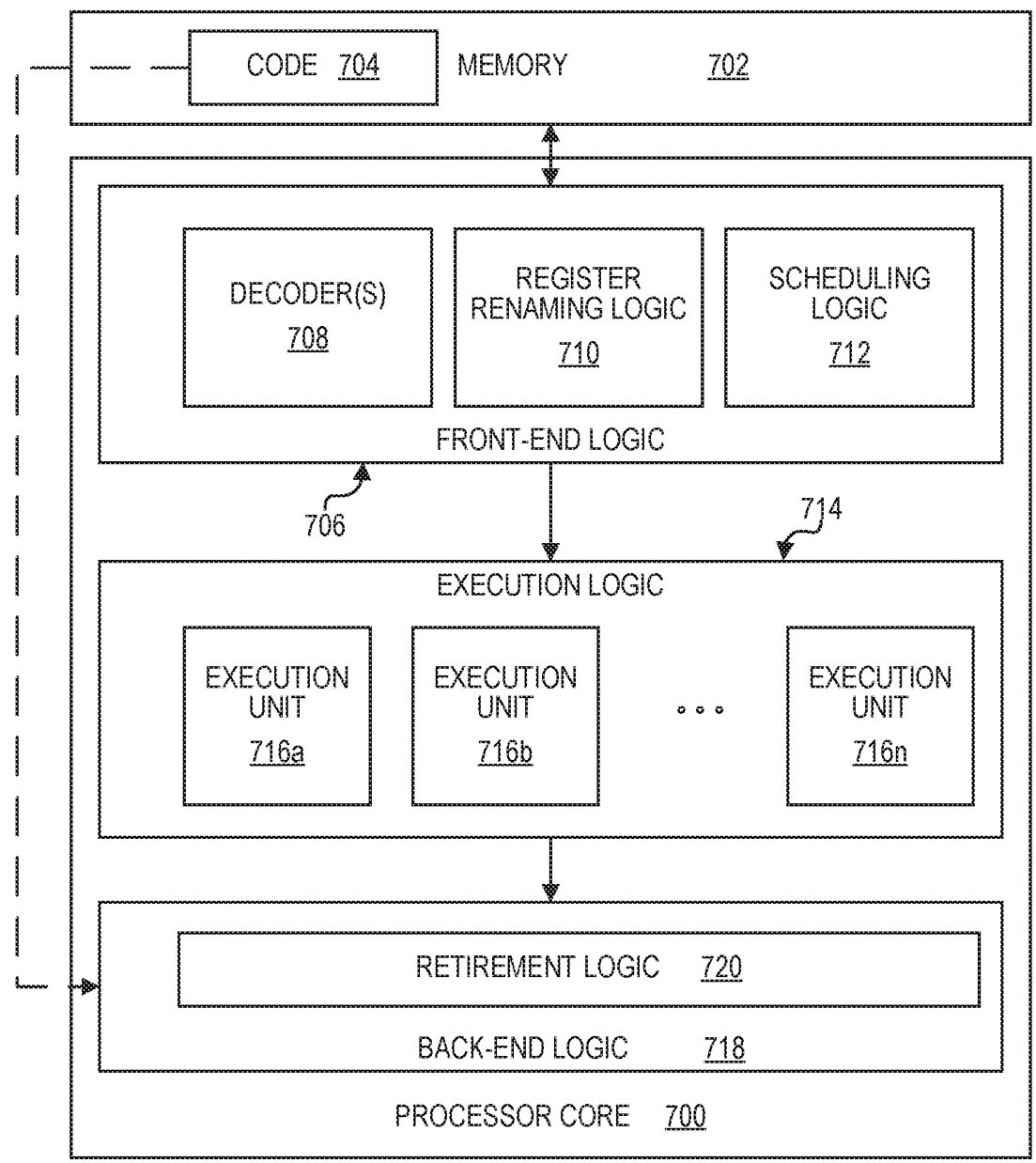
FIG. 7 is a block diagram illustrating an example processor core and memory according to at least one embodiment.
Figure 8:
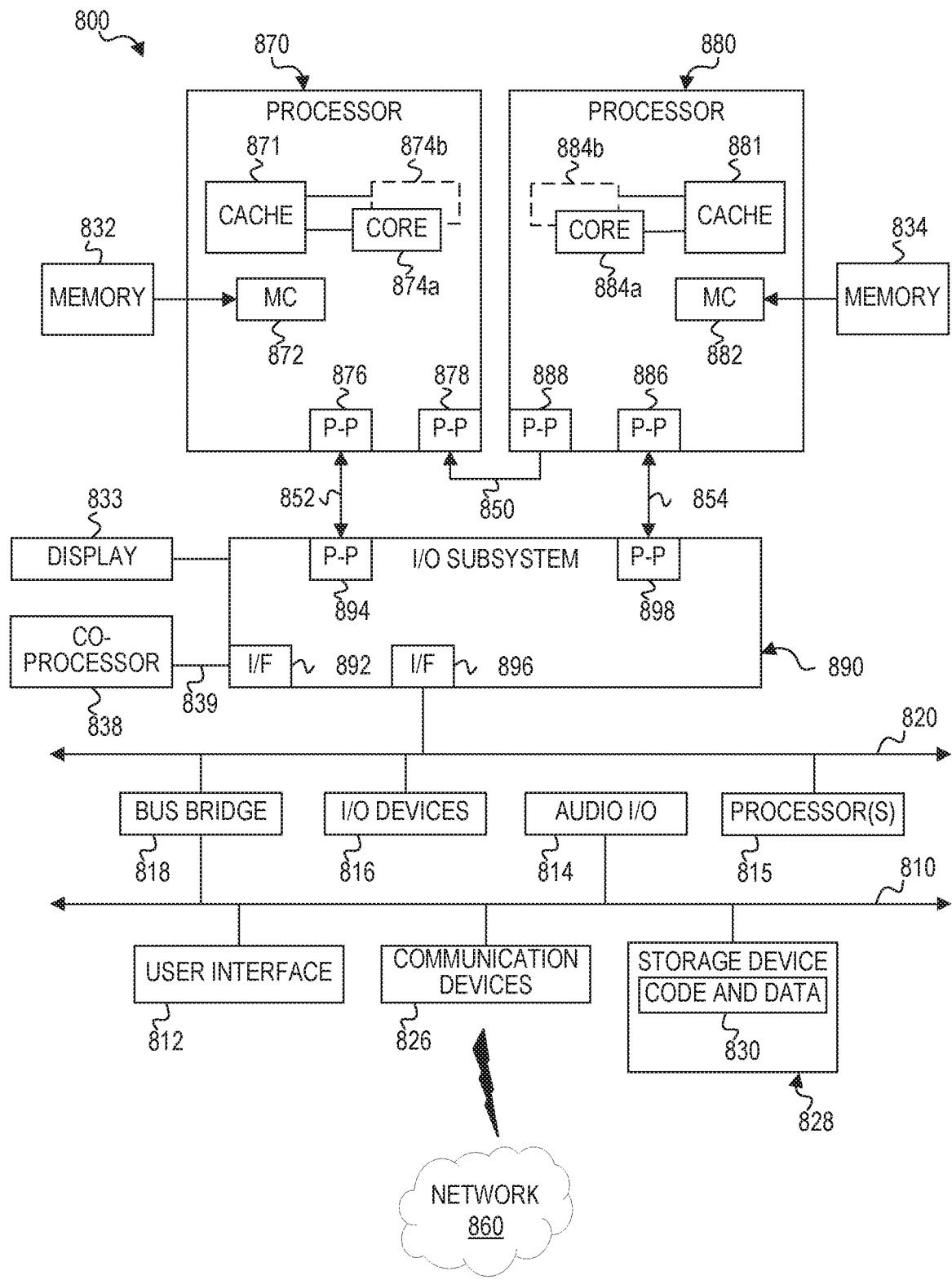
FIG. 8 is a block diagram of an example computer architecture according to at least one embodiment.

FIGS. 7-8 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 7-8.

FIG. 7 is an example illustration of a processor according to an embodiment. Processor 700 is an example of a type of hardware device that can be used in connection with the implementations above. Processor 700 may be any type of processor, such as a microprocessor, an embedded processor, a digital signal processor (DSP), a network processor, a multi-core processor, a single core processor, or other device to execute code. Although only one processor 700 is illustrated in FIG. 7, a processing element may alternatively include more than one of processor 700 illustrated in FIG. 7. Processor 700 may be a single-threaded core or, for at least one embodiment, the processor 700 may be multi-threaded in that it may include more than one hardware thread context (or "logical processor") per core.

FIG. 7 also illustrates a memory 702 coupled to processor 700 in accordance with an embodiment. Memory 702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 700 can execute any type of instructions associated with algorithms, processes, or operations detailed herein. Generally, processor 700 can transform an element or an article (e.g., data) from one state or thing to another state or thing.

Code 704, which may be one or more instructions to be executed by processor 700, may be stored in memory 702, or may be stored in software, hardware, firmware, or any suitable combination thereof, or in any other internal or external component, device, element, or object where appropriate and based on particular needs. In one example, processor 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor 700 can also include execution logic 714 having a set of execution units 716a, 716b, 716n, etc. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor 700 allows out of order execution but requires in order retirement of instructions. Retirement logic 720 may take a variety of known forms (e.g., re-order buffers or the like). In this manner, processor 700 is transformed during execution of code 704, at least in terms of the output generated by the decoder, hardware registers and tables utilized by register renaming logic 710, and any registers (not shown) modified by execution logic 714.

Although not shown in FIG. 7, a processing element may include other elements on a chip with processor 700. For example, a processing element may include memory control logic along with processor 700. The processing element may include I/O control logic and/or may include I/O control logic integrated with memory control logic. The processing element may also include one or more caches. In some embodiments, non-volatile memory (such as flash memory or fuses) may also be included on the chip with processor 700.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the computing systems or computing devices described herein may be configured in the same or similar manner as computing system 800.

Processors 870 and 880 may be implemented as single core processors 874a and 884a or multi-core processors 874a-874b and 884a-884b. Processors 870 and 880 may each include a cache 871 and 881 used by their respective core or cores. A shared cache (not shown) may be included in either processors or outside of both processors, yet connected with the processors via P-P interconnect, such that either or both processors' local cache information may be stored in the shared cache if a processor is placed into a low power mode.

Processors 870 and 880 may also each include integrated memory controller logic (MC) 872 and 882 to communicate with memory elements 832 and 834, which may be portions of main memory locally attached to the respective processors. In alternative embodiments, memory controller logic 872 and 882 may be discrete logic separate from processors 870 and 880. Memory elements 832 and/or 834 may store various data to be used by processors 870 and 880 in achieving operations and functionality outlined herein.

Processors 870 and 880 may be any type of processor, such as those discussed in connection with other figures. Processors 870 and 880 may exchange data via a point-to-point (PtP) interface 850 using point-to-point interface circuits 878 and 888, respectively. Processors 870 and 880 may each exchange data with an input/output (I/O) subsystem 890 via individual point-to-point interfaces 852 and 854 using point-to-point interface circuits 876, 886, 894, and 898. I/O subsystem 890 may also exchange data with a high-performance graphics circuit 838 via a high-performance graphics interface 839, using an interface circuit 892, which could be a PtP interface circuit. In one embodiment, the high-performance graphics circuit 838 is a special-purpose processor, such as, for example, a high-throughput MIC processor, a network or communication processor, compression engine, graphics processor, GPGPU, embedded processor, or the like. I/O subsystem 890 may also communicate with a display 833 for displaying data that is viewable by a human user. In alternative embodiments, any or all of the PtP links illustrated in FIG. 8 could be implemented as a multi-drop bus rather than a PtP link.

I/O subsystem 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a user interface 812 (such as a keyboard, mouse, touchscreen, or other input devices), communication devices 826 (such as modems, network interface devices, or other types of communication devices that may communicate through a computer network 860), audio I/O devices 814, and/or a data storage device 828. Data storage device 828 may store code and data 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and Y, but not Z; 5) at least one X and Z, but not Y; 6) at least one Y and Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

The following examples pertain to embodiments in accordance with this specification. It will be understood that one or more aspects of certain examples described below may be combined with or implemented in certain other examples, including examples not explicitly indicated.

Example 1 includes a processor comprising: a memory hierarchy storing encrypted data; and a core coupled to the memory hierarchy. The core comprises circuitry to: access the encrypted data stored in the memory hierarchy; decrypt the encrypted data to yield decrypted data; perform an entropy test on the decrypted data; and update a processor state based on a result of the entropy test.

Example 2 includes the subject matter of Example 1, and optionally, wherein the circuitry to perform the entropy test is to perform a set of operations, the set of operations comprising at least one of: determining a number of data entities in the decrypted data whose values are equal to one another; determining a number of adjacent data entities in the decrypted data whose values are equal to one another; determining a number of data entities in the decrypted data whose values are equal to at least one special value from a set of special values; and determining a sum of n highest data entity value frequencies.

Example 3 includes the subject matter of Example 2, and optionally, wherein the circuitry to perform the entropy test is further to: generate a Boolean output for each operation in the set of operations based on a comparison of a number determined by the operation with a respective threshold; perform a logical OR operation on the generated Boolean outputs; and update the processor state based on an output of the logical OR operation.

Example 4 includes the subject matter of Example 2, and optionally, wherein the circuitry to perform the entropy test is further to: determine, for each operation, an entropy index based on a number determined by the operation; determine a maximum entropy index of the determined entropy indices; compare the maximum entropy index with a threshold; and update the processor state based on the comparison.

Example 5 includes the subject matter of any one of Examples 2-4, and optionally, wherein the data entities comprise one of a byte, a 16-bit word, a 32-bit doubleword, and a nibble.

Example 6 includes the subject matter of any one of Examples 2-5, and optionally, wherein the circuitry to determine the sum of n highest data entity value frequencies is to perform one or more of: determining a sum of n highest nibble frequencies; determining a sum of n highest most significant nibble frequencies; and determining a sum of n highest least significant nibble frequencies.

Example 7 includes the subject matter of Example 6, and optionally, wherein n=2.

Example 8 includes the subject matter of any one of Examples 1-7, and optionally, wherein the processor further comprises an RFLAGS register, and the core circuitry is to update the processor state by updating a bit in the RFLAGS register.

Example 9 includes the subject matter of any one of Examples 1-7, and optionally, wherein the processor further comprises a Model-Specific Register (MSR), and the core circuitry is to update the processor state by storing in the MSR information about one or more patterns detected in the decrypted data and a number of entities demonstrating the one or more patterns.

Example 10 includes the subject matter of any one of Examples 1-7, and optionally, wherein the processor further comprises a Model-Specific Register (MSR), and the core circuitry is to update the processor state by storing in the MSR at least one measure of entropy determined by the entropy test.

Example 11 includes the subject matter of any one of Examples 1-10, and optionally, wherein the memory hierarchy comprises one or more of a Level-1 (L1) cache, a Level-2 (L2) cache, and a Level-3 (L3) cache.

Example 12 includes a method comprising: receiving, at a processor core, encrypted data from a memory hierarchy; decrypting the encrypted data in the processor core; determining whether the decrypted data is of low entropy; and updating one or more processor register values based on a determination that the data is of low entropy.

Example 13 includes the subject matter of Example 12, and optionally, wherein determining whether the decrypted data is of low entropy comprises performing at least one of: determining a number of data entities in the decrypted data whose values are equal to one another; determining a number of adjacent data entities in the decrypted data whose values are equal to one another; determining a number of data entities in the decrypted data whose values are equal to at least one special value from a set of special values; and determining a sum of n highest data entity value frequencies.

Example 14 includes the subject matter of Example 13, and optionally, wherein determining whether the decrypted data is of low entropy further comprises: generating a Boolean output for each operation in the set of operations based on a comparison of a number determined by the operation with a respective threshold; and performing a logical OR operation on the generated Boolean outputs; wherein updating the processor register values is based on an output of the logical OR operation.

Example 15 includes the subject matter of Example 13, and optionally, wherein determining whether the decrypted data is of low entropy further comprises: determining, for each operation, an entropy index based on a number determined by the operation; determining a maximum entropy index of the determined entropy indices; and comparing the maximum entropy index with a threshold; wherein updating the processor register values is based on the comparison.

Example 16 includes the subject matter of any one of Examples 13-15, and optionally, wherein the data entities comprise one of a byte, a 16-bit word, a 32-bit doubleword, and a nibble.

Example 17 includes the subject matter of any one of Examples 13-15, and optionally, wherein determining the sum of n highest data entity value frequencies comprises one or more of: determining a sum of n highest nibble frequencies; determining a sum of n highest most significant nibble frequencies; and determining a sum of n highest least significant nibble frequencies.

Example 18 includes the subject matter of Example 17, and optionally, wherein n=2.

Example 19 includes the subject matter of any one of Examples 12-18, and optionally, wherein updating one or more processor register values comprises updating a bit in an RFLAGS register.

Example 20 includes the subject matter of any one of Examples 12-18, and optionally, wherein updating one or more processor register values comprises storing, in a Model-Specific Register, information about one or more patterns detected in the decrypted data and a number of entities demonstrating the one or more patterns.

Example 21 includes the subject matter of any one of Examples 12-18, and optionally, wherein updating one or more processor register values comprises storing, in a Model-Specific Register, at least one measure of entropy determined by the entropy test.

Example 22 includes a computer-readable medium storing instructions that when executed by a data processing apparatus are to perform any one of the methods of Examples 12-21.

Example 23 includes an apparatus configured to perform any one of the methods of Examples 12-21.

Example 24 includes a system comprising means to perform one or more steps of any one of the methods of Examples 12-21.

Example 25 includes a computer-readable medium storing instructions that when executed by a data processing apparatus are to: access encrypted data stored in a memory hierarchy; decrypt the encrypted data to yield decrypted data; perform an entropy test on the decrypted data; and update one or more bits of a register in the data processing apparatus based on a result of the entropy test.

Example 26 includes the subject matter of Example 25, and optionally, wherein the instructions to perform the entropy test are to perform a set of operations comprising at least one of: determining a number of data entities in the decrypted data whose values are equal to one another; determining a number of adjacent data entities in the decrypted data whose values are equal to one another; determining a number of data entities in the decrypted data whose values are equal to at least one special value from a set of special values; and determining a sum of n highest data entity value frequencies.

Example 27 includes the subject matter of Example 26, and optionally, wherein the instructions to perform the entropy test are further to: generate a Boolean output for each operation in the set of operations based on a comparison of a number determined by the operation with a respective threshold; perform a logical OR operation on the generated Boolean outputs; and update the processor state based on an output of the logical OR operation.

Example 28 includes the subject matter of Example 26, and optionally, wherein the instructions to perform the entropy test are further to: determine, for each operation, an entropy index based on a number determined by the operation; determine a maximum entropy index of the determined entropy indices; compare the maximum entropy index with a threshold; and update the processor state based on the comparison.

Example 29 includes the subject matter of any one of Examples 25-28, and optionally, wherein the instructions to update the processor state are to update a bit of an RFLAGS register.

Example 30 includes the subject matter of any one of Examples 25-28, and optionally, wherein the instructions to update the processor state are to update one or more bits of a Model-Specific Register (MSR).

Example 31 includes the subject matter of Example 30, and optionally, wherein the instructions to update the processor state are to store, in the MSR, information about one or more patterns detected in the decrypted data and a number of entities demonstrating the one or more patterns.

Example 32 includes the subject matter of Example 30, and optionally, wherein the instructions to update the processor state are to store, in the MSR, at least one measure of entropy determined by the entropy test.

Example 33 may include a device comprising logic, modules, circuitry, or other means to perform one or more elements of a method described in or related to any of the examples above or any other method or process described herein.

What is claimed is:

1. A processor comprising:
   a memory hierarchy storing encrypted data; and
   a core coupled to the memory hierarchy, the core comprising circuitry to:
      access the encrypted data stored in the memory hierarchy;
      decrypt the encrypted data to yield decrypted data;
      perform an entropy test on the decrypted data; and
      update a processor state based on a result of the entropy test.

2. The processor of claim 1, wherein the circuitry to perform the entropy test is to perform a set of operations, the set of operations comprising at least one of:
   determining a number of data entities in the decrypted data whose values are equal to one another;
   determining a number of adjacent data entities in the decrypted data whose values are equal to one another;
   determining a number of data entities in the decrypted data whose values are equal to at least one special value from a set of special values; and
   determining a sum of n highest data entity value frequencies.

3. The processor of claim 2, wherein the circuitry to perform the entropy test is further to:
   generate a Boolean output for each operation in the set of operations based on a comparison of a number determined by the operation with a respective threshold;
   perform a logical OR operation on the generated Boolean outputs; and
   update the processor state based on an output of the logical OR operation.

4. The processor of claim 2, wherein the circuitry to perform the entropy test is further to:
   determine, for each operation, an entropy index based on a number determined by the operation;

determine a maximum entropy index of the determined entropy indices;

compare the maximum entropy index with a threshold; and update the processor state based on the comparison.

5. The processor of claim 2, wherein the data entities comprise one of a byte, a 16-bit word, a 32-bit doubleword, and a nibble.

6. The processor of claim 2, wherein the circuitry to determine the sum of n highest data entity value frequencies is to perform one or more of:

determining a sum of n highest nibble frequencies;

determining a sum of n highest most significant nibble frequencies; and determining a sum of n highest least significant nibble frequencies.

7. The processor of claim 6, wherein n=2.

8. The processor of claim 1, wherein the processor further comprises an RFLAGS register, and the core circuitry is to update the processor state by updating a bit in the RFLAGS register.

9. The processor of claim 1, wherein the processor further comprises a Model-Specific Register (MSR), and the core circuitry is to update the processor state by storing in the MSR information about one or more patterns detected in the decrypted data and a number of entities demonstrating the one or more patterns.

10. The processor of claim 1, wherein the processor further comprises a Model-Specific Register (MSR), and the core circuitry is to update the processor state by storing in the MSR at least one measure of entropy determined by the entropy test.

11. The processor of claim 1, wherein the memory hierarchy comprises one or more of a Level-1 (L1) cache, a Level-2 (L2) cache, and a Level-3 (L3) cache.

12. A method comprising:

receiving, at a processor core, encrypted data from a memory hierarchy;

decrypting the encrypted data in the processor core;

determining whether the decrypted data is of low entropy; and updating a processor state maintained in a processor register based on a determination that the data is of low entropy.

13. The method of claim 12, wherein determining whether the decrypted data is of low entropy comprises performing a set of operations comprising at least one of:

determining a number of data entities in the decrypted data whose values are equal to one another;

determining a number of adjacent data entities in the decrypted data whose values are equal to one another;

determining a number of data entities in the decrypted data whose values are equal to at least one special value from a set of special values; and determining a sum of n highest data entity value frequencies.

14. The method of claim 13, wherein determining whether the decrypted data is of low entropy further comprises:

generating a Boolean output for each operation in the set of operations based on a comparison of a number determined by the operation with a respective threshold; and performing a logical OR operation on the generated Boolean outputs;

wherein updating the processor state is based on an output of the logical OR operation.

15. The method of claim 13, wherein determining whether the decrypted data is of low entropy further comprises:

determining, for each operation, an entropy index based on a number determined by the operation;

determining a maximum entropy index of the determined entropy indices; and comparing the maximum entropy index with a threshold;

wherein updating the processor state is based on the comparison.

16. A non-transitory computer-readable medium storing instructions that when executed by a data processing apparatus are to:

access encrypted data stored in a memory hierarchy;

decrypt the encrypted data to yield decrypted data;

perform an entropy test on the decrypted data; and update a processor state maintained in a register of the data processing apparatus based on a result of the entropy test.

17. The computer-readable medium of claim 16, wherein the instructions to perform the entropy test are to perform a set of operations comprising at least one of:

determining a number of data entities in the decrypted data whose values are equal to one another;

determining a number of adjacent data entities in the decrypted data whose values are equal to one another;

determining a number of data entities in the decrypted data whose values are equal to at least one special value from a set of special values; and determining a sum of n highest data entity value frequencies.

18. The computer-readable medium of claim 17, wherein the instructions to perform the entropy test are further to:

generate a Boolean output for each operation in the set of operations based on a comparison of a number determined by the operation with a respective threshold;

perform a logical OR operation on the generated Boolean outputs; and update the processor state based on an output of the logical OR operation.

19. The computer-readable medium of claim 17, wherein the instructions to perform the entropy test are further to:

determine, for each operation, an entropy index based on a number determined by the operation;

determine a maximum entropy index of the determined entropy indices;

compare the maximum entropy index with a threshold; and update the processor state based on the comparison.

20. The computer-readable medium of claim 16, wherein the instructions to update the processor state are to update one or more bits of an RFLAGS register or a Model-Specific Register (MSR).

* * * * *